May 13, 1941.  R. J. WOODS  2,242,202
AUXILIARY MOTOR INSTALLATION
Filed Dec. 1, 1938  3 Sheets-Sheet 1
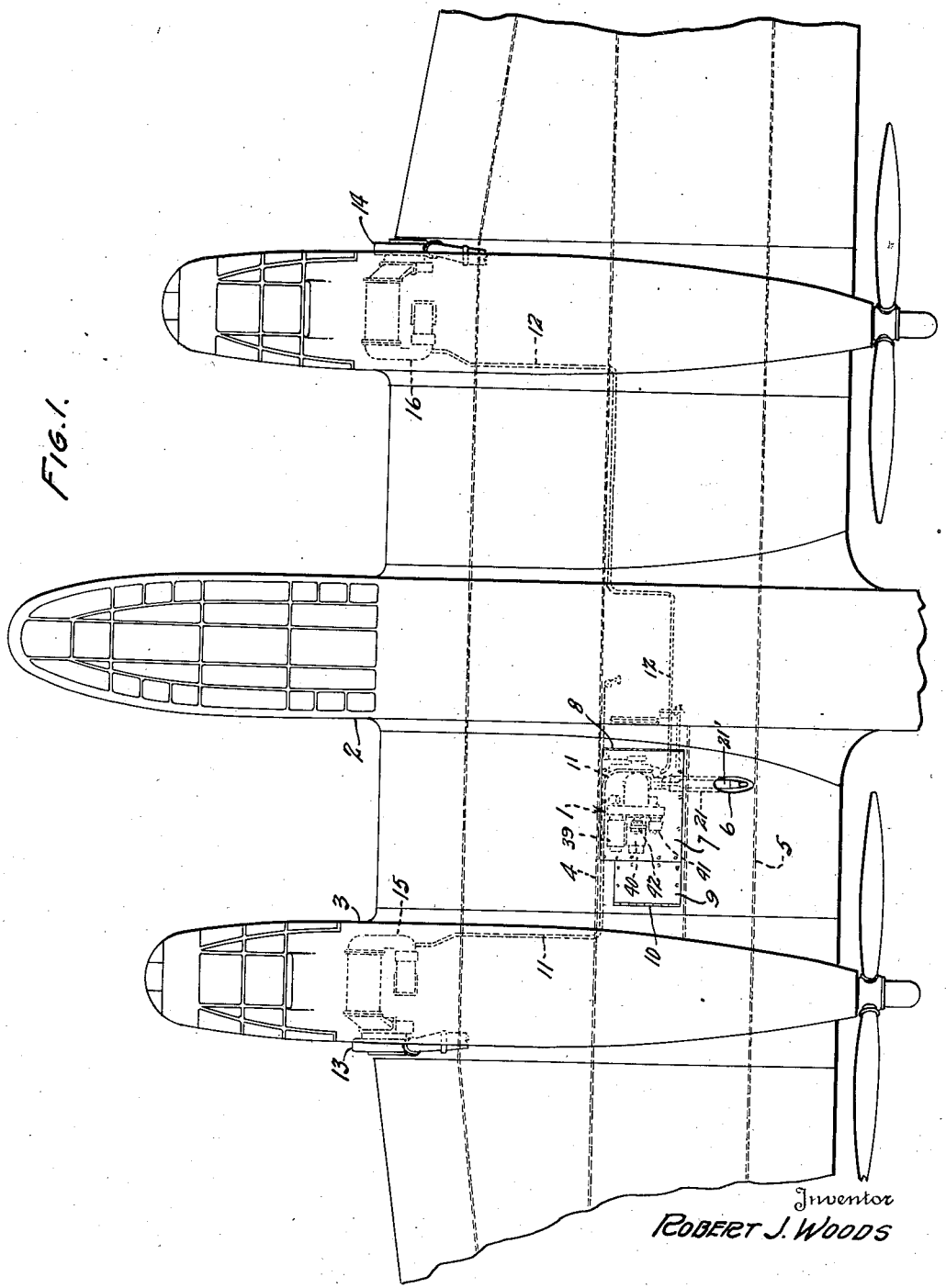
Inventor
ROBERT J. WOODS
By Semmes Keegin & Semmes
Attorneys

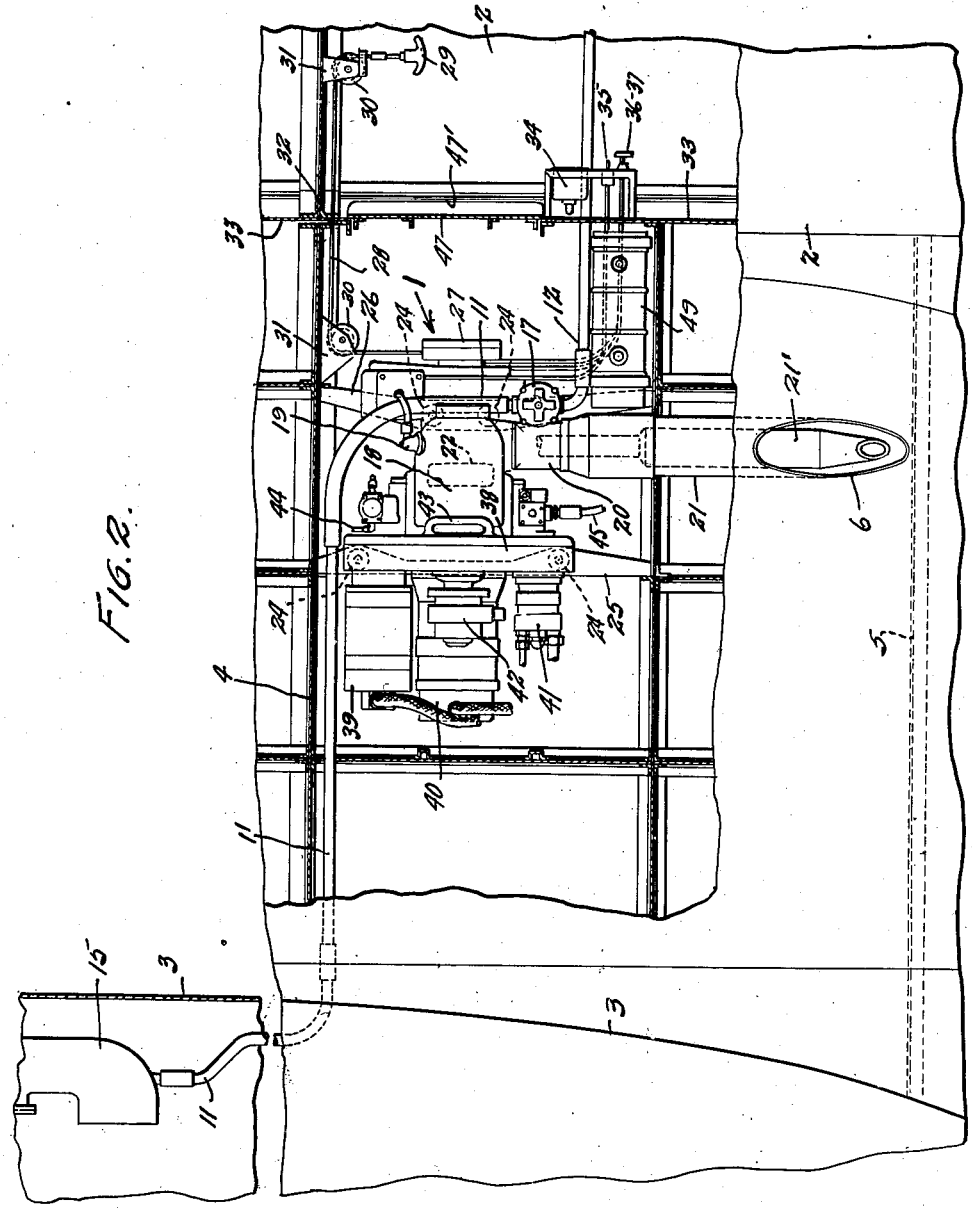

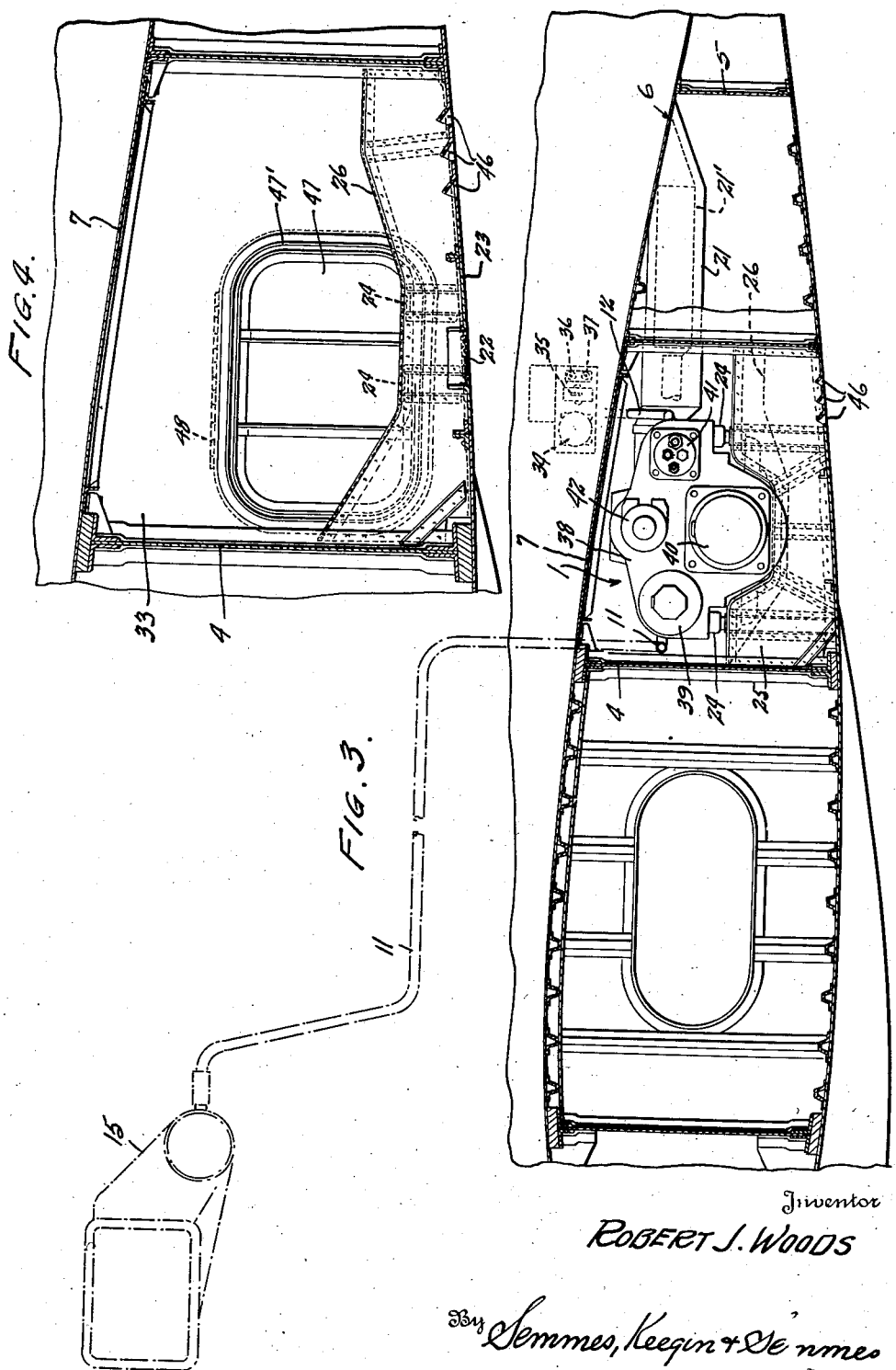

Patented May 13, 1941

2,242,202

UNITED STATES PATENT OFFICE 2,242,202

AUXILIARY MOTOR INSTALLATION

Robert J. Woods, Grand Island, N. Y., assignor to Bell Aircraft Corporation, Buffalo, N. Y., a corporation of New York Application December 1, 1938, Serial No. 243,476

2 Claims. (Cl. 244—53)

My invention relates to an auxiliary engine installation for airplanes, and more particularly to an auxiliary engine mounted in the wing of an airplane together with its associated apparatus.

In the past, difficulties have been encountered in supplying the necessary electric power, hydraulic pressure and air pressure systems that are necessary in a large airplane. It has been difficult to locate an auxiliary engine so as to minimize both fire hazard and the likelihood of exhaust fumes in the other parts of the airplane, and at the same time provide a light and compact installation that will operate at various altitudes with the minimum of necessary controls. It has been difficult to place an auxiliary engine in a portion of the airplane that is not suitable for human occupancy and yet allow, while in flight, some degree of accessibility to the engine so that minor adjustments and repairs may be made while in flight and also at the same time allow effective control of the engine by means of control members in the operator's compartment.

One of the objects of my invention is to overcome the above mentioned difficulties.

Another object of my invention is to place an auxiliary engine between the rear beam and the auxiliary beam in the trailing edge of the wing.

Still another object of my invention is to supply air for combustion in the engine from the same source of supercharged air that is provided for the propelling engines.

Yet another object of my invention is to provide a completely enclosed auxiliary engine which has a short and direct exhaust connection extending through the skin of the airplane and shielded from the airplane proper by an air duct cooled by a flow of air.

A further object of my invention is to provide a simplex starter operable from an operator's compartment with a cord extending into the auxiliary engine compartment, and indicators and controls likewise extending from one compartment to the other.

A still further object of my invention is to provide an auxiliary engine presenting the parts most likely to need adjustment or repair on the side next to the operator's compartment with a removable hatch separating the operator from the engine.

With these and other objects of my invention which will be apparent from the succeeding description, my invention in its preferred form consists briefly of an auxiliary engine driving necessary equipment for the operation of an airplane placed between the rear beam and the auxiliary beam in the trailing edge of the wing between the left nacelle and the fuselage. This engine is supplied with air for the carburetor from the ducts for supercharged air used to supply the propelling engines.

A grating in the bottom surface of the wing supplies cooling air to an air jacket surrounding the engine cylinder and thence to an air duct guiding this flow of air along the length of the exhaust pipe from the engine to its tip at the skin of the wing. Suitable packings prevent this air from escaping into the engine compartment and forcing engine fumes out into the operator's compartments. The entire effect of this flow of air is to cool the engine cylinder and the exhaust pipe and to carry any possible leakage of gases from them on out into the atmosphere. Any fumes from other parts of the engine are drawn out by louvers extending through the bottom and rear of the auxiliary engine compartment to the bottom surface of the wing, thus preventing their escape into the other parts of the airplane.

The auxiliary engine has grouped on its side away from the operator's compartment an air compressor, an oil pump, a generator, and an alternator. The centralized location of this auxiliary engine enables short connections to be used between these four parts, just mentioned, and the various electrical, pneumatic, and hydraulic pieces of apparatus in the plane. While the auxiliary engine is isolated in its own compartment and all the necessary controls are in an operator's compartment, there is nevertheless a connecting hatch allowing access to the engine during flight, so that minor adjustments and repairs can be made.

In order to make my invention more clearly understood, I have shown it in the accompanying drawings in my preferred form, but it is to be understood that these figures are illustrative rather than limiting.

Figure 1 is a fragmental plan view of an airplane showing my installation of an auxiliary motor.

Figure 2 is an enlarged fragmental plan view showing the central portion of the installation.

Figure 3 is a vertical longitudinal section through the auxiliary engine compartment.

Figure 4 is a vertical longitudinal section taken between the left side of the fuselage and the nearest supporting member for the auxiliary motor.

Referring to Figure 1, it can be seen that the auxiliary motor assembly shown generally as 1 is located between the fuselage 2 and the left nacelle 3, between rear beam 4 and the auxiliary beam 5 of an outboard powered, multi-engined airplane. An air duct exit 6 is formed into the top surface of the wing near the auxiliary beam 5. A flush hatch 7 suitably secured with the skin of the wing as by bolting is attached by multiple hinge 8 to the wing. A flush hatch 9 fitting over the compartment adjacent the motor compartment, likewise suitably secured as by bolting, is attached by hinge 10. Air pipes 11 and 12 attached to the superchargers 13 and 14 and their respective air ducts 15 and 16 leading to the propelling motors are utilized for supplying air at an even pressure to the auxiliary motor 1. Pipes 11 and 12 are connected to the carburetor intake 17, as best shown in Figure 2.

Referring now to Figure 2, motor assembly 1 comprises a motor block of aircooled construction, together with apparatus driven thereby. An air shield 18 through which projects the spark plug cap 19 carries a flow of air around the cooling fins of the cylinder through an outlet collar 20 flexibly connecting shield 18 with an air duct 21, which surrounds the engine exhaust pipe 21', leading to the air duct opening 6. Shield 18 is supplied with a constant flow of air through a grating 22 in a door 23 which lies flush with the bottom skin of the wing, as best shown in Figure 4.

Referring to Figures 2 and 3, engine 1 is carried by resilient mountings 24 fitting upon engine mounts 25 and 26. The purpose of flexible collar 20 is, therefore, to allow freedom of movement for the engine 1 without causing destructive stresses between it and the air duct casing 21.

The auxiliary engine is seen to have a simplex starter 27 connected by pull cord 28 to starting handle 29. Cord 28 is suitably guided as by pulleys 30 journaled in brackets 31. An appropriate opening 32 allows passage of the starting cord 28 from the engine compartment through the bulkhead 33 to the operator's compartment in the fuselage. Appropriately connected to the auxiliary engine is the temperature gauge 34, the ignition switch 35 and engine controls 36 and 37, all connected through suitable apertures in bulkhead 33 allowing said members 34, 35, 36, and 37 to be in operative connection with the motor. A suitable drive mechanism housed in a casing 38 connects the crank shaft of the auxiliary motor to transmit rotary power to a generator 39, an alternator 40, an oil pump 41, and an air pump 42. A handle 43 positioned on the motor side of the transmission mechanism 38 enables the auxiliary motor unit to be lifted from its compartment with the auxiliary engine assembly balanced in its normal position relative to the wing. A fuel intake line 44 and a crank case oil connection 45 are additional adjuncts to the auxiliary motor.

Referring to Figures 3 and 4, it will be seen that the engine mounts 25 and 26 are cut down at the center to allow space for the auxiliary motor to fit across them. The engine compartment has at its lower rear wall which is the lower skin of the wing, louvers 46 which during flight tend to create a negative pressure within the engine compartment relative to that of the surrounding atmosphere. Thus, any escaping engine fumes are prevented from entering the operator's compartment, but instead are withdrawn into the atmosphere.

Referring to Figures 2 and 4, door 47 normally closing a hatchway 47' in bulkhead 33 is upwardly swingable on multiple hinge 48 to permit access to the engine 1 from the operator's compartment during flight.

It will be noted that ignition mechanism and the carburetor, together with the starting apparatus and the oil tank 49, are nearest the hatchway 47'. For more serious repairs, hatch covers 7 and 9 are provided, it being possible to withdraw the auxiliary engine from the wing through the hatchway guarded by hatch cover 9. For adjustment of the cooling screen 22, the removable door 23 is provided.

It will thus be seen that I have provided an auxiliary engine for airplanes in an accessible position, together with its connected equipment, so that maintenance and repair are facilitated. Furthermore, the electrical, hydraulic, and air systems are connected with the minimum length of tubing and wires.

It can also be seen that the present invention enables an efficient, but simple, cooling of the auxiliary engine, not only to preserve its efficiency but also in such a way as to prevent the escape of heat and fumes to other parts of the airplane.

Additionally, it can be seen that this invention enables complete control of the engine from within the fuselage with a minimum of control members.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An assembly of an internal combustion motor together with its cooling and ventilating equipment all faired within the normal contour of an airplane wing in such a way that no projections extend therefrom, comprising a fuselage, a wing, means to form a motor compartment bounded on its upper side by a portion of the upper surface of the wing next to the fuselage, said motor compartment being bounded on its lower side by a portion of the lower surface of the wing, a hatch removably separating said motor compartment from the fuselage, louvers formed in a portion of the lower surface of the wing that also forms the lower wall of said motor compartment, said louvers being arranged to draw air downward out of the compartment when the airplane is in normal horizontal flight, whereby fumes that may escape from the motor may be drawn away from the fuselage and whereby any movement of air past said hatch may be toward the louvers, an intake connection for cooling air in the bottom wall of the compartment, a casing extending from said intake opening and extending to and enclosing the combustion-chamber portion of the motor, said casing also extending from said enclosing portion toward the trailing edge of the wing to an opening in the top surface of the wing, and an exhaust connection extending from said combustion-chamber portion of the motor to said opening in the top surface of the wing, said exhaust connection extending inside said casing and terminating in a tapered end, whereby a flow of cooling air is induced through said casing to cool the motor and exhaust pipe and carry away fumes.

2. An assembly of an internal combustion motor together with its cooling and ventilating equipment all faired within the normal contour of an airplane wing in such a way that no projections extend therefrom, comprising a fuselage, a wing, means to form a motor compartment bounded on its upper side by a portion of the upper surface of the wing next to the fuselage, said motor compartment being bounded on its lower side by a portion of the lower surface of the wing, a hatch removably separating said motor compartment from the fuselage, louvers formed in a portion of the lower surface of the wing that also forms the lower wall of said motor compartment, said louvers being arranged to draw air downward out of the compartment when the airplane is in normal horizontal flight, whereby fumes that may escape from the motor may be drawn away from the fuselage and whereby any movement of air past said hatch may be toward the louvers, an intake connection for cooling air in the bottom wall of the compartment, a casing extending from said intake opening and extending to and enclosing the combustion-chamber portion of the motor, said casing also extending from said enclosing portion toward the trailing edge of the wing to an opening in the top surface of the wing, an exhaust connection extending from said combustion-chamber portion of the motor to said opening in the top surface of the wing, said exhaust connection extending inside said casing and terminating in a tapered end, whereby a flow of cooling air is induced through said casing to cool the motor and exhaust pipe and carry away fumes, and means to supply supercharged air to said combustion-chamber portion of the motor, said supply means being separate from said casing.

ROBERT J. WOODS.